CHARLES W. MOORE, OF SAN FRANCISCO, CALIFORNIA.

Letters Patent No. 90,677, dated June 1, 1869.

IMPROVEMENT IN REDUCING SULPHUR-ORES.

The Schedule referred to in these Letters Patent and making part of the same.

*To all whom it may concern:*

Be it known that I, CHARLES W. MOORE, of San Francisco city and county, and State of California, have invented certain new and useful Improvements in the Art of Working or Reducing Sulphuretted Ores and Pyrites, which I call "Moore's Desulphurizing-Process;" and I do hereby declare that the following is a full and exact description thereof.

The nature of my invention consists in the use of black oxide of manganese, burnt lime, and charcoal, in the proportions hereinafter set forth, to destroy sulphurets containing gold or silver, or both, and to thereby render the precious metal contained therein easy of amalgamation.

To enable others skilled in the art to make and use my invention, I will proceed to describe the method of using the same, and its operation.

I take, of black oxide of manganese, forty parts or per centum; of burnt lime, thirty parts or per centum; and of charcoal, thirty parts or per centum, the above proportions being by weight. This combination I call my desulphurizer.

I then take of the desulphurizer and of the ore to be treated, using the proportion of one part of desulphurizer to four parts of the ore, sulphurets or pyrites which I am working. I mix the desulphurizer and the ore intimately, either in an amalgamating-pan or before putting them into the pan, as is most convenient.

When the mixture is well completed, and the same is put into an amalgamating-pan, I inject water, hot or cold, or steam, or superheated steam, as may be most convenient, into the mass, in such quantities as will suffice to make a thin paste of the mixture of desulphurizer and ore in the pan.

I then work this thin paste in the pan for four or five hours, and afterwards draw off the pulp into a separator, where I run it with quicksilver and water, for four hours, using in the separator fifty pounds of quicksilver to thirty pounds of water and one hundred pounds of ore, or in that proportion.

The ore to be treated and the desulphurizer should be pulverized previous to being mixed.

The benefits to be derived from this process are, the complete freeing of the precious metals, held in the sulphurets, from other metallic matter, whereby they are rendered easy of amalgamation in the working.

What I claim as my invention, and desire to secure by Letters Patent, is—

The use of black oxide of maganese, burnt lime, and charcoal, in combination or together, as a desulphurizer, substantially in the proportion and manner, and for the purposes specified.

CHAS. W. MOORE.

Witnesses:
GEO. C. WALLER.
C. H. PARSONS.